3,451,969
POLYURETHANES CROSS-LINKED WITH
TETROLIN-1,4-DIOL
Perry A. Argabright, Littleton, Colo., assignor to Marathon Oil Company, Findlay, Ohio, a corporation of Ohio
No Drawing. Filed Oct. 23, 1965, Ser. No. 504,079
Int. Cl. C08g 22/04, 22/18, 51/74
U.S. Cl. 260—75
10 Claims

ABSTRACT OF THE DISCLOSURE

The present invention relates to compositions containing the formula:

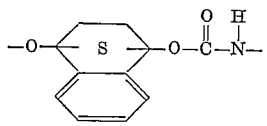

and to processes for their manufacture. Said compositions are useful in coating formulations, to form foamed compositions, in adhesives, casting materials, and for other purposes.

---

The present invention relates to new polymeric urethane compositions, and in particular, relates to compositions derived from the reaction of isocyanates and tetralin diol.

It has now been discovered that the glycol, 1,4-dihydroy-1,2,3,4-tetrahydronaphthalene (herein referred to as tetralin diol) is a superior curing agent for polyurethane compositions and especially for polyurethane elastomers. The qualities of tetralin diol derived polymeric materials, especially elastomers, are superior to those utilizing conventional diols. In particular, substantial increases in tensile strength and tear resistance can be obtained by partially or wholly substituting tetralin diol for conventional polyurethane curing agents.

The tetralin diol utilized in the present invention is preferably prepared by the techniques outlined more fully in Ser. No. 330,000, filed Dec. 12, 1963, by P. A. Argabright, now U.S. Patent 3,375,285 and assigned to the assignee of the present invention.

The compositions of the present invention can be produced by reacting tetralin diol with conventional isocyanate terminated prepolymers. The prepolymers may be of the polyester or of the polyether type, although for the preparation of elastomers, the polyesters are preferred. The isocyanate-terminated prepolymers are made by the conventional methods employing the reaction of a diisocyanate (herein used to include also triisocyanates) with a hydroxyl-terminated polyester or polyether as shown in the following equations:

2 O=C=N—R—N=C=O + HO—Z—OH →
Diisocyanate         Polyester or Polyether

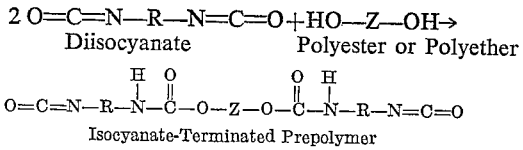

Isocyanate-Terminated Prepolymer where Z is a divalent organic radical preferably a hydrocarbon radical having from 2 to about 20 carbon atoms.

Diisocyanates usitable for the preparation of the prepolymers include: 2,4-tolylene diisocyanate; 2,6-tolylene diisocyanate; 1,5-naphthalene diisocyanate; 2,7-naphthalene diisocyanate; 4,4'-diphenylmethane diisocyanate, triphenylmethane triisocyanate, hexamethylene diisocyanate; and octadecamethylene diisocyanate for example. Especially preferred are mixtures of 2,4- and 2,6-tolylene diisocyanate particularly those containing from 80 to 100 mole percent of the 2,4-isomer. Among the hydroxyl-terminated polyesters or polyethers suitable for the preparation of the prepolymers are for example: polyethylene glycol, polypropylene glycol, poly (1,4-oxybutylene) glycol, polyethylene adipate and polypropylene adipate. The ratio of diisocyanate to polyol utilized in forming the prepolymers for use in the present invention should preferably be at least about 2:1 on a mole basis. In general, the preferred prepolymers will have molecular weights of from about 600 to 10,000 and most preferably from 800 to about 4,000.

These prepolymers are admixed with the tetralin diol of the present invention in amounts which will vary according to the properties desired. In most cases, an NCO/OH mole ratio of from about 0.5 to 5 and most preferably from 1 to 2 is desirable to obtain products of high molecular weight. The tetralin diol is simply mixed thoroughly with the prepolymer and any other curing agents or catalyst or softening agents such as silicones and the resulting mixture heated at the desired temperature. The mixture may be diluted with solvents, e.g., xylenes and used as a coating formulation, or mixed with blowing agents or an excess of water to form foamed compositions, either rigid or flexible, or the composition may be used as an adhesive or as a solid casting material, all according to conventional techniques.

While the tetralin diol imparts properties which are desirable in a wide variety of applications, it is especially preferred for the formulation of polymeric elastomers. Elastomers formulated with tetralin diol exhibit generally higher tensile strengths and tear resistances than elastomers formulated with conventional diols.

Because the tetralin diol is reacted with a prepolymer which has itself been highly reacted to form relatively large molecules, as little as about 5 weight percent of tetralin diol is sufficient to impart superior properties in most cases. Thus, compositions containing at least about 5 percent by weight of groups having the following structure will be preferred:

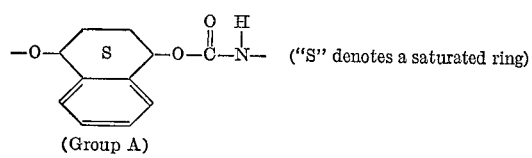

(Group A)

Higher amounts of tetralin diol will generally be used and especially preferred are those polymeric compositions containing at least about 20 weight percent of Group A as illustrated in the following structure

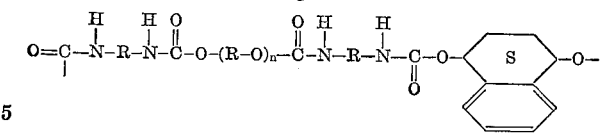

Throughout this specification $n$ is an integer of from 1 to about 100; R is a hydrocarbon radical free from substituents which would interfere with the reactions of the present invention and preferably containing from 2 to about 20 and most preferably from 2 to about 8 carbon atoms and where the R groups may be alkyl, alkenyl, alkynyl, aryl, alkylaryl, cycloalkyl, or substituted derivatives of the foregoing which do not interfere with the reactions of the present invention and where the R's may be the same or different.

Where desirable, additional diols or cross-linking agents such as triols may also be mixed with the prepolymer. Various curing agents including triamines and cobalt and other metal naphthenates may be added.

The process of curing the prepolymer-tetralin diol formation is relatively slow. As the polymer chains lengthen, the mobility of the reactive groups is decreased and it becomes increasingly difficult for these groups to come together. Long post cures are generally required to bring the polymers to a final state of cure, and it is well known that the method of post curing can have an effect on the properties of the polymer. The polymers may be heated in an oven, or permitted to age at room temperature for several weeks or even longer or they may be kept in a steam cabinet. In general, heat will tend to shorten the time required for a full cure. Moisture from the ambient air or from the steam cabinet is generally useful if the polymers are to be cured by moisture.

The above discussion has described methods for curing conventional prepolymers with tetralin diol. It should be understood that there are other methods of inserting tetralin diol radicals into the finished polymer molecule. Tetralin diol may be reacted with excess diisocyanate to yield a tetralin diol based diisocyanate

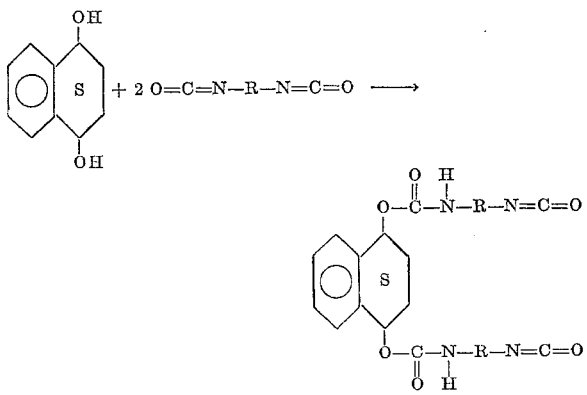

which in turn may be reacted with a hydroxyl-terminated polyester or polyether to yield compositions similar to those described previously.

In each of these alternatives, the effect on the properties of finished polymeric material will be approximately proportional to the weight percent of tetralin diol radicals contained in the cured composition. In general, the structures and weight percentages mentioned above in conjunction with the curing of conventional polyols with tetralin diol will be preferred.

Persons skilled in the art will recognize that the present invention is adaptable to a wide variety of apparent modifications and variations according to conventional principles and methods in the polymer fields. All such apparent modifications and variations are to be taken as being included in the claims which are appended hereto, and the examples and discussions herein are intended to be merely illustrative of the invention.

EXAMPLE I

Mobay Multrathane R-14 polyester resin (hydroxyl-terminated polyethylene adipate with a molecular weight of about 2,000) was utilized in making polyester polyurethanes. This prepolymer was utilized because it had been used in much of the work reported in the literature, particularly that dealing with elastomeric polyurethanes.

Multrathane R-14 (60 g. approximately 0.03 mole) is melted under a vacuum of about 5 mm. at 130° C. and held under these conditions for about 15 minutes to remove traces of water. Tolylene diisocyanates (16.8 g., approximately 0.097 mole) is then added to the molten R-14 and the mixture is heated under a vacuum of about 5 mm. at 125° C. for about 15 minutes to produce an isocyanate-terminated prepolymer. 1,4 - dihydroxytetralin (9.72 g., approximately 0.059 mole) is mixed with the molten prepolymer and the mixture is poured into a cavity sheet mold. The mold is placed in a vacuum chamber and held under a vacuum of about 5 mm. until the entrapped air is substantially removed from the mixture. The mold is then closed and placed in an oven at 110° C. for curing. After a curing period of approximately 24 hours, the resulting elastomer is removed from the mold and post cured at 25° C. for about 30 hours. Test specimens are then cut from the cured sheets and evaluated for physical properties. Data on the physical properties are given in Table 1.

EXAMPLE II

According to the procedures of Example I, a second batch of elastomer is prepared utilizing similar ingredient quantities and cure times (as shown in Table 1) but substituting an approximately equal molar quantity of 1,4-butane diol for the tetralin diol used in Example I. The physical properties given in Table 1 indicate that the elastomer prepared from tetralin diol according to the present invention had a tensile strength approximtaely 173%

TABLE 1

| Materials | Ex. I (the invention) | Ex. II (conventional) | Ex. III (th invention) |
|---|---|---|---|
| Multrathane R-14, g | 60.0 | 60.0 | 60.0 |
| TDI, g | 16.8 | 16.8 | |
| MDI, g | | | 24.0 |
| 1,4-dihydroxytetralin | 9.72 | | 9.72 |
| 1,4-butanediol | | 5.40 | |
| Cure time, hours at 110° C | 24 | 32 | 24 |
| Post cure, days at 25° C | 30 | 30 | (¹) |
| Properties: | | | |
| Tensile strength, psi | 4450 | 2580 | 7630 |
| Hardness, Shore A | 65 | 57 | 79 |
| Elongation at break, percent | 650 | 780 | 500 |
| 500% modulus, p.s.i | 500 | 310 | |
| 300% modulus, p.s.i | | | 1370 |

¹ Post cured 10 days at 25° C. followed by 8 hours at 110° C.

that of the conventional elastomer, together with higher hardness and generally higher modulus.

EXAMPLE III

A sample is prepared according to the methods of Example I utilizing the same ingredients and approximately the same quantities, but substituting an approximately equal molar amount of methylene-bis-4-phenylisocyanate for the toluene diisocyanate employed in Example I. The tensile strength, hardness, and modulus are found to be higher than those of the product of Example I.

EXAMPLE IV

The elastomer described in Example III is found superior in conventionally determined tear strength to a similar composition in which 1,4-butane diol is employed as the coupling, shown in the following table:

Elastomer: Tear Strength, lb./in.²
  Example III _____ 390
  Conventional ¹ _____ 240–270

¹ Range of data reported in literature for compositions derived from Multrathane R-14+methylene-bis-4-phenylisocyanate coupled with 1,4-butane diol.

EXAMPLE V

A prepolymer is prepared according to the methods of Example I utilizing the same ingredients but substituting tetralin diol in equal molar quantities for the Multrathane R-14 used in Example I. A sample of this prepolymer is then cured according to the method of Example I utilizing Multrathrane R-14 in the cure. A second sample of the prepolymer is cured according to the method of Example II utilizing 1,4-butane diol in the cure. Both of the finished elastomers are superior in tensile strength to the conventional elastomer not containing tetralin diol as prepared in Example II.

EXAMPLE VI

A solution containing 2.54 g. tetralin diol (0.0156 mole) and 11.40 g. polyether based isocyanate prepolymer (from the reaction of 43.03 g. tolylene diisocyanate (0.248 mole) with 50.0 g. polyethylene glycol, molecular weight 400 (0.125 mole) at 60° C. for 5 hours in 15 ml. of dimethylformamide (solvent) is allowed to react at 60° C.

for 4 hours. The resulting viscous solution is poured into water to yield a tough elastomeric product.

In an identical experiment wheerin 1,4-butane diol is used in place of tetralin diol, the product is a stringy substance of dramatically inferior tensile strength and tear strength to the above product in which tetralin diol is incorporated.

What is claimed is:
1. Polyurethane compositions having high tensile strength and tear resistance comprising at least about 5 moles percent groups having the following structure:

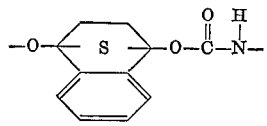

2. Polyurethane compositions having high tensile strength and tear resistance comprising at least about 20 mole percent groups having the following structure:

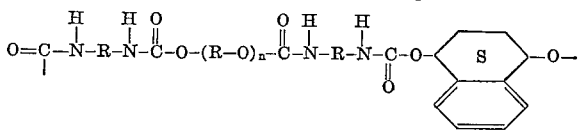

where $n$ is an integer from 1 to about 100, where R's are divalent hydrocarbon radicals free from groups which would interfere with the reactions of the present invention, where R—O is a divalent polyol radical, and where the R's may be the same or different.

3. The composition of claim 2 wherein R—O is a divalent polyether radical.
4. The composition of claim 2 wherein R—O is a divalent polyester radical.
5. The composition of claim 2 wherein R—O is a divalent polyester-ether radical.
6. Polymer compositions having high tensile strength and tear resistance consisting essentially of the reaction product formed by the reaction of approximately stoichiometric quantities of isocyanate terminated linear prepolymer with tetralin 1,4-diol.
7. Polyurethane compositions comprising the reaction product of 1,4-tetralin diol and isocyanate terminated prepolymers selected from the group consisting of polyester urethane prepolymers and polyether urethane prepolymers.

8. The product of claim 7 wherein the isocyanate terminated prepolymer is prepared by the reaction of a polyester-diol with a diisocyanate selected from the group consisting of 2,4-tolylene diisocyanate; 2,6-tolylene diisocyanate; 1,5-naphthalene diisocyanate; 2,7-naphthalene diisocyanate; 4,4-diphenylmethane diisocyanate; triphenylmethane triisocyanate, hexamethylene diisocyanate; octadecamethylene diisocyanate, and mixtures of two or more of the above.

9. The product of claim 7 wherein the isocyanate terminated prepolymer is prepared by the reaction of a polyether diol with a diisocyanate selected from the group consisting of 2,4-tolylene diisocyanate; 2,6-tolylene diisocyanate; 1,5-naphthalene diisocyanate; 2,7-naphthalene diisocyanate; 4,4'-diphenylmethane diisocyanate; triphenylmethane triisocyanate; hexamethylene diisocyanate; octadecamethylene diisocyanate; and mixtures of two or more of the above.

10. The product of claim 7 wherein the isocyanate terminated prepolymer is prepared by the reaction of a polyesterether diol with a diisocyanate selected from the group consisting of 2,4-tolylene diisocyanate; 2,6-tolylene diisocyanate; 1,5-naphthalene diisocyanate; 2,7-naphthalene diisocyanate; 4,4' diphenylmethane diisocyanate; triphenylmethane triisocyanate, hexamethylene diisocyanate; octadecamethylene diisocyanate; and mixtures of two or more of the above.

References Cited
UNITED STATES PATENTS

| | | | |
|---|---|---|---|
| 2,861,972 | 11/1958 | Mueller et al. | 260—45.4 |
| 2,998,403 | 8/1961 | Mueller et al. | 260—45.4 |
| 3,288,823 | 11/1966 | Vanderwerff | 260—410.5 |

OTHER REFERENCES

Saunders & Frisch: Polyurethanes, Part II, Interscience, New York (1964) pp. 308–319; 341–347.

Pigott et al. Jour. of Chemical & Engineering Data, vol. 5, No. 3 (July 1960) pp. 391–395.

HOSEA E. TAYLOR, JR., *Primary Examiner.*

H. S. COCKERAM, *Assistant Examiner.*

U.S. Cl. X.R.
260—2.5, 77.5